United States Patent

Pouyez et al.

[11] Patent Number: 5,832,161
[45] Date of Patent: Nov. 3, 1998

[54] DEVICE FOR TAKING UP THE SLACK ALLOWED FOR PUTTING A CONDUCTOR TERMINATION INTO REGISTER WITH ANOTHER ELEMENT

[75] Inventors: Philippe Pouyez, Argenteuil; Pierre Kayoun, Boulogne, both of France

[73] Assignee: Amphenol Socapex, France

[21] Appl. No.: 895,028

[22] Filed: Jul. 16, 1997

[30] Foreign Application Priority Data

Jul. 17, 1996 [FR] France .................................... 96 08928

[51] Int. Cl.$^6$ ........................................................ G02B 6/38
[52] U.S. Cl. .............................. 385/76; 439/346; 385/59; 385/136
[58] Field of Search ..................................... 439/346, 359, 439/102; 385/76, 59, 136, 147

[56] References Cited

U.S. PATENT DOCUMENTS

| 4,854,662 | 8/1989 | McCartney | 350/96.22 |
| 5,386,486 | 1/1995 | Fan et al. | 385/59 |
| 5,581,645 | 12/1996 | Gehri | 385/78 |

FOREIGN PATENT DOCUMENTS

| 676513 | 1/1991 | Switzerland | G02B 6/38 |

OTHER PUBLICATIONS

IBM Technical Disclosure Bulletin, vol. 20, No. 3, Aug. 1977, New York, p. 893. R.L. Stokley: "Fiberoptic Cable Termination Device."

Patent Abstracts of Japan, vol. 007, No. 073 (P–186) Mar. 25, 1983, "Multiconnector for Optical Fiber."

Primary Examiner—Hung N. Ngo
Attorney, Agent, or Firm—Bacon & Thomas

[57] ABSTRACT

The invention relates to a device for putting an optical conductor termination into register. The termination of the conductor is cylindrical. It has an axis XX' and a diameter D. The device comprises a base provided with means for putting it into register relative to another element. The base is pierced by a cylindrical orifice of diameter D'>D about an axis YY'. The base is provided with pusher means having an active end penetrating into the cylindrical orifice. The pusher means exert a force along an axis ZZ' orthogonal to YY' and intersecting the axis YY' of the cylindrical orifice. The pusher means act on the optical conductor termination in such a manner that a generator line of the termination is pressed against a generator line AA' of the cylindrical orifice defined by the axis ZZ'.

8 Claims, 4 Drawing Sheets

DEVICE FOR TAKING UP THE SLACK ALLOWED FOR PUTTING A CONDUCTOR TERMINATION INTO REGISTER WITH ANOTHER ELEMENT

The present invention relates to a device for taking up the slack allowed for putting an electrical or optical conductor termination into register with another element, and preferably another element of the same kind.

BACKGROUND OF THE INVENTION

In the case of optical conductor connectors, high quality signal transmission requires the termination(s) of the optical conductor(s) of one of the connector elements to be accurately positioned or put into register relative to the corresponding optical conductor terminal(s) of the other optical connector element. Any misalignment disturbs optical signal transmission.

For certain electrical connectors, and in particular connectors used for coupling electrical conductors used in the microwave frequency or in the radiofrequency range, it is likewise necessary for the electrical conductor terminations in the two elements of the connector to be positioned with very great accuracy.

In the present text, the term "optical conductor termination" is used to designate either the bare end of an optical fiber, or a lens, or a lens secured to an optical fiber, e.g. by means of a ferrule, or indeed a light emitter or a light receiver or a light emitter/receiver. In all these cases, the termination possesses at least one cylindrical surface portion.

A real need can therefore be seen to exist, particularly in the manufacture of optical connectors and of some electrical connectors, for a system that makes it possible to put into register very accurately the termination or the conductor terminals or the conductors mounted on the connector element.

OBJECTS AND SUMMARY OF THE INVENTION

Whether the termination is for optical conductors or for electrical conductors, the problem consists in aligning in pairs elements that are cylindrical in shape and which include respective cylindrical surface portions. This putting into register must make it possible to guarantee the required positioning accuracy while remaining disconnectable, and must ensure good reproducibility on reassembly or realignment. It is also preferable to be able to guarantee good resistance to vibrating environments and to changes of temperature.

According to the invention, this object is achieved by a registering device for putting the termination of a conductor into register relative to another element, said termination having at least one cylindrical surface portion about an axis XX' and having a diameter D, said device comprising:

a base fitted with means for putting it into register relative to the other element and pierced by at least one orifice whose wall includes at least one cylindrical surface portion of diameter D'>D and of axis YY', extending over a length L; and pusher means for exerting a force along an axis ZZ' orthogonal to YY' and intersecting the axis YY' of the orifice in its cylindrical portion, said pusher means acting on the conductor termination in such a manner that a generator line of the termination is pressed against a generator line AA' of the orifice as defined by the axis ZZ', said generator line AA' occupying a determined position relative to the registering means of the base;

the pusher means acting over a portion of the conductor termination that is of sufficient length to ensure that the generator line of the termination is pressed against the generator line AA' of the orifice over a length that is sufficient to ensure that the axis XX' of said termination is indeed parallel to the axis YY' of the orifice.

It will be understood that in accordance with the invention the conductor termination is put into register with the other element in two steps. Firstly, by construction of the base, the reference means are put into register relative to the axis of the orifice provided in the base, and secondly the axis of the optical termination is put into register relative to a well-defined generator line of the orifice, said generator line being defined by the direction of the force applied by the pusher-forming means.

It will also be understood that because of the action of the pusher means acting over a sufficient length, not only is the end, i.e. the terminal face, of the termination put into register, but also the axis of the conductor termination is itself effectively put into register.

Finally, it can be seen that because of the way pusher means are used, the conductor can be disconnected from the base in simple manner.

In a variant embodiment, the registering device can be applied to putting n conductor terminations mounted in the base into register with another element. In this embodiment, said base comprises n orifices each including at least one cylindrical portion of axis $Y_1Y'_1$, said axes being mutually parallel, and said orifices being of diameters $D'_i$ greater than the diameters $D_i$ of the terminations, and the pusher means comprise a single control member and n pusher members controlled by said control member, each pusher member being associated with an orifice and exerting a force on the corresponding termination in a direction $Z_iZ'_i$.

It will be understood that the pusher means which are controlled by a single member enable a generator line of each termination to be pressed against a generator line of each of the cylindrical orifices, which generator line is well determined in advance, thereby ensuring that each of the terminations is put into register relative to the registering means of the base and relative to the other element.

BRIEF DESCRIPTION OF THE DRAWINGS

Other characteristics and advantages of the invention appear better on reading the following description of various embodiments of the invention given by way of non-limiting example. The description refers to the accompanying figures, in which.

MORE DETAILED DESCRIPTION

Figure 1:
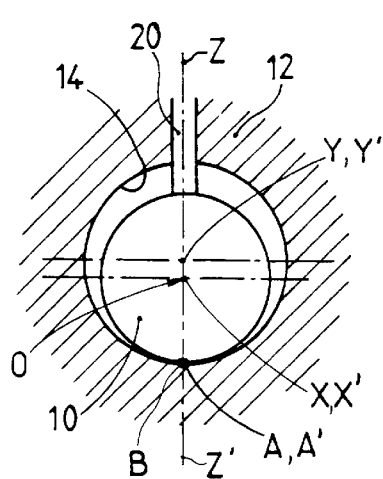
FIGS. 1 and 2 are respectively a cross-section view and a longitudinal section view of a device for putting conductor terminations into register and illustrating the principle of the invention.
Figure 2:
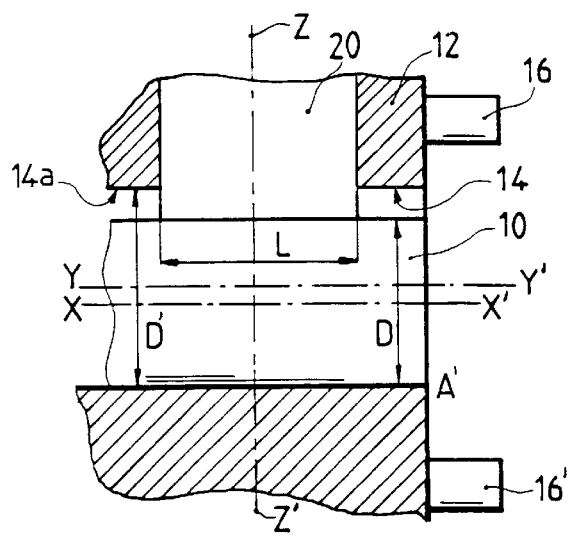

With reference initially to FIGS. 1 and 2, the principle of the registering device of the invention is described. The termination 10 to be put into register is cylindrical in shape having a diameter D about an axis XX', or at least its periphery includes a cylindrical surface portion of diameter D about the axis XX'. Thus termination is put into register relative to another element (not shown in the figures) by means of a mechanical part or base 12 which is pierced by a cylindrical orifice 14 of diameter D' greater than the diameter D of the termination. This orifice 14 has an axis YY'. The axis YY' is accurately positioned relative to position referencing elements 16 and 16' secured to the base. Also, the diameter of the orifice 14 is likewise defined with high precision. In other words, all of the generator lines of the inside wall 14a of the orifice 14 are accurately defined relative to the registering elements 16, 16'. To put the termination 10 into register relative to the registering elements 16 and 16', the termination 10 is inserted into the orifice 14, and pusher means 20 are used to apply force on the outside cylindrical face of the termination 10. If force is applied in a direction ZZ' that is orthogonal to the axis YY' of the orifice and that intersects said axis, then contact between the outside wall of the termination 10 and the inside wall 14a of the orifice 14 takes place substantially along a generator line of the termination and along a generator line AA' of the wall of the orifice. The generator line AA' is fully determined by the direction ZZ' along which the pusher 20 acts on the termination. This generator line is the line passing through the point of intersection B between the axis ZZ' and the wall of the orifice 14. As a result, the axis XX' of the termination 10 is put accurately into register relative to the registering members 16 and 16'.

To ensure that it is indeed the axis XX' which is put into register and not only the center O of the end face 10a of the termination, the pusher 20 acts on the periphery of the termination over a length L that is sufficient to ensure that contact does indeed take place over a portion of a generator line.

It will be understood that since contact between the termination 10 and the cylindrical wall of the orifice 14 takes place along a single generator line, the positioning that is obtained is extremely precise.

When the periphery of the termination has only one cylindrical surface portion about the axis XX' and the orifice 14 also has only one cylindrical surface portion about the axis YY', then it is necessary for the direction ZZ' along which the pusher applies force to be such that contact between the periphery of the termination and the inside wall of the orifice takes place in the zone where both cylindrical surfaces are present so that said contact does indeed take place along a generator line AA' of the orifice 14.

It can also be seen that the device of the invention obviates the effects of any differential thermal expansion that may occur between the orifice and the termination.

The initial clearance or "slack" is sufficient to accommodate such differential expansion, and the pusher exerts force on the termination in the direction ZZ' regardless of variations in the diameters of the termination and of the orifice.

Now that the principle of the invention has been described, there follows a description by way of example of various embodiments of the registering device applying the principle as described in detail above.

The pusher means are preferably constituted by a deformable annular ring whose outside diameter is caused to be increased by compression using a mechanical system. The outside diameter of the annular ring acts on the periphery of the conductor termination in the desired direction and therefore acts as the above-described pusher 20. It should be added that in FIGS. 1 and 2, the difference between the diameter D of the termination and the diameter D' of the orifice 14 is deliberately greatly exaggerated. In reality, these two diameters are close to each other, and consequently the displacement to be applied to the conductor termination is of very small amplitude.

Figure 4:
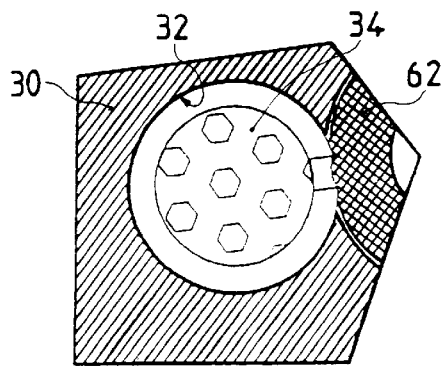
FIG. 4 is a fragmentary view on a larger scale of the FIG. 3 device in section on line 4—4.
Figure 3:
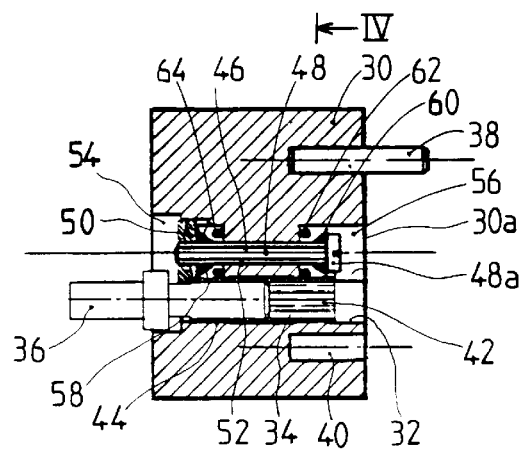
FIG. 3 is a longitudinal section view of a first embodiment of a device for putting a single conductor termination into register.

FIGS. 3 and 4 show a first embodiment of the registering device when only one termination is to be put into register.

FIG. 3 shows the base 30 provided with its cylindrical orifice 32 in which the termination 34 of the optical conductor 36 is engaged. Its front face 30a has means for putting it into register with the other element. By way of example, these registering means are a positioning stud 38 and a positioning housing 40 designed to receive the stud of the other element. In the particular example described, the termination 34 is constituted by the optical cable 36 at the end of which a lens 42 or some other appropriate optical system is secured. The assembly is held together by a metal ferrule 44. The cylindrical part which is to be put into register is thus the ferrule 44 of diameter D. The pusher device is given overall reference 46 and is constituted by a screw 48 which co-operates with a nut 40. The screw 48 is freely engaged in an axial bore 52 of the base 30. The head 48a of the screw and the nut 50 are received in housings 54 and 56 which are in communication with the cylindrical orifice 32. The head 48a of the screw and the nut 50 are fitted with respective conical washers 58 and 60. Finally, O-rings 62 and 64 are mounted around the shank of the screw at opposite ends of the bore 52, which O-rings are made of deformable elastomer material. It will be understood that by tightening the screw 48 in the nut 50, the outside diameters of the O-rings 62 and 64 are caused to expand by the conical washers moving towards each other. Each O-ring is clamped between the nut or the head of the screw and a stationary mechanical abutment constituted by the end wall of the corresponding housing 54 or 56. As a result, a portion of the periphery of each O-ring bears against the wall 54 of the termination 34 causing said termination to be pressed against the generator line of the orifice 32 in the manner explained above. It should be emphasized that these means constitute an equivalent of the pusher 20, and they are easy to actuate. To install the termination 34, the screw is fully loosened, and thereafter it suffices to tighten the screw to press against the termination.

Figure 5:
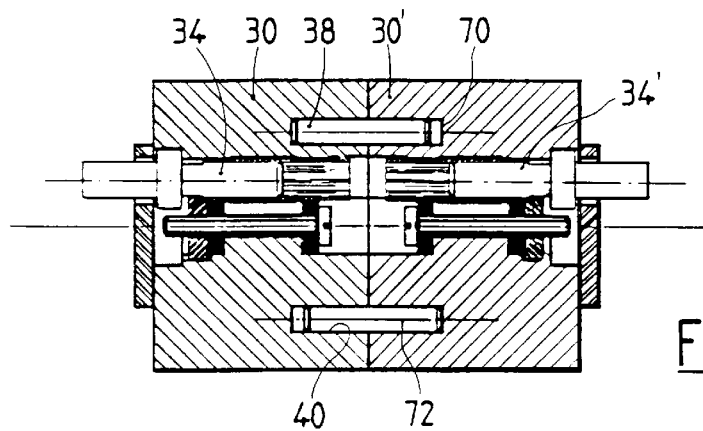
FIG. 5 shows coupling between two registering devices of the invention.

FIG. 5 shows two identical bases 30 and 30' which enable the termination 34 to be put into register in the base 30 and the termination 34' in the base 30'. This figure shows the housing 70 in the base 30' which receives the stud 38, and the stud 72 which penetrates into the housing 40 of the base 30. It will be understood that this ensures that the axes of the terminations 34 and 34' are accurately put into register relative to each other.

It should be observed that the termination is displaced by both O-rings 62 and 64. The distance between the two O-rings is sufficient to ensure that the axis of the termination is indeed put into register, in the manner explained above.

Figure 8:
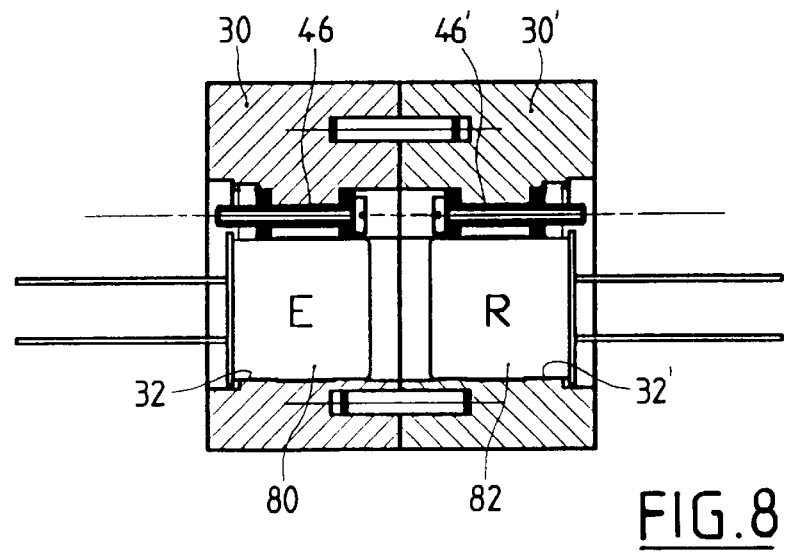
FIG. 8 shows an example of the device of the invention being used for putting a light emitter into register with a light receiver.

FIG. 8 shows the use of the device of the invention for putting an optical emitter 80 into register with an optical receiver 82. The bases 30 and 30' include respective cylindrical orifices 32 and 32' of sufficient diameter to enable the emitter and the receiver to be inserted, which emitter and receiver are naturally both generally cylindrical in shape. Each base is fitted with a displacement control system 46 or 46' identical to that described with reference to FIGS. 3 and 4.

In the description above, only one termination is put into register with one other termination. It will nevertheless be understood that the registering device of the invention can be used for putting a plurality of optical or electrical terminations into register. This applies, for example, when it is desired to put four optical fibers in a first connector element into register with four other optical fibers in a second connector element, or more generally when at least two terminations are involved.

Figure 6A:
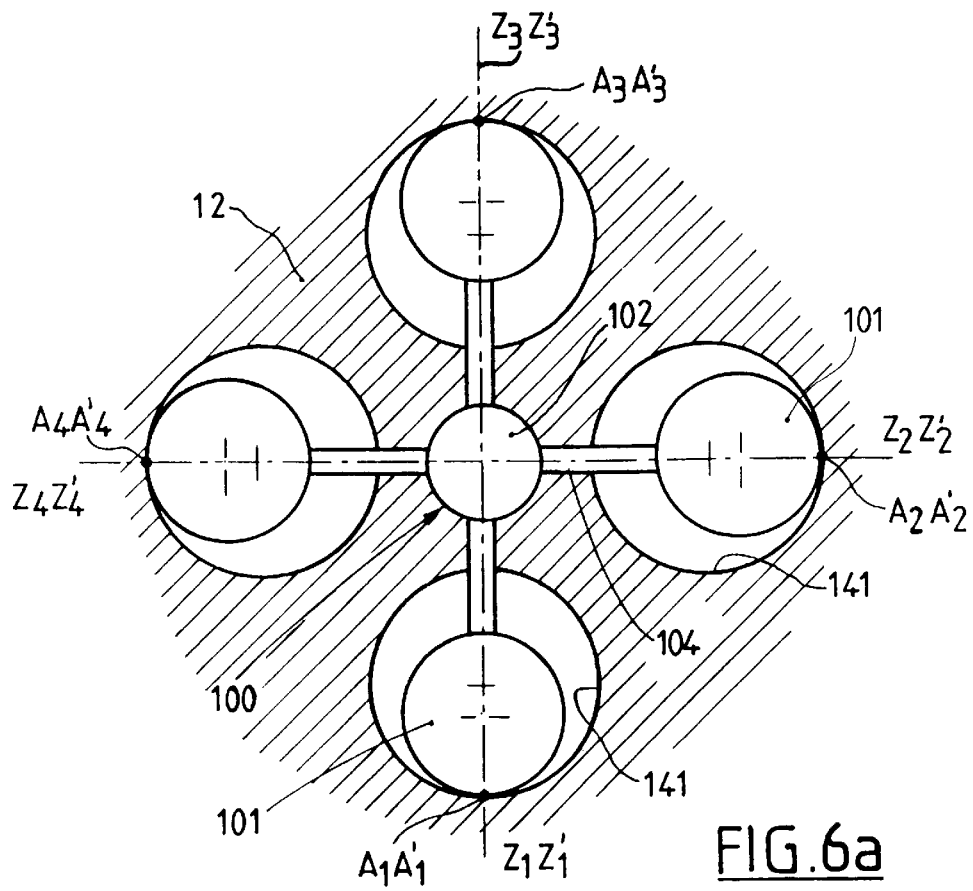
FIG. 6a is a diagram showing a plurality of terminations being put into register.

FIG. 6a is a diagram of four terminations $10_1$, $10_2$, etc. which are installed in respective cylindrical orifices $14_1$, $14_2$, etc. formed in the base 12. The cylindrical orifices 14 all have axes YY' that are mutually parallel and perpendicular to the plane of the figure. The device also includes pusher-forming means 100 which, using a single control member 102, serves to displace pushers such as 104 which bear against the various terminations. The pushers exert forces in directions $Z_i$, $Z'_i$ as shown in FIG. 6a, and registering therefore takes place along the generator lines $A_i$, $A'_i$ of the various orifices defined by the directions $Z_i$, $Z'_i$. All of the various terminations $10_i$ are therefore put in register simultaneously.

Figures 6, 7:
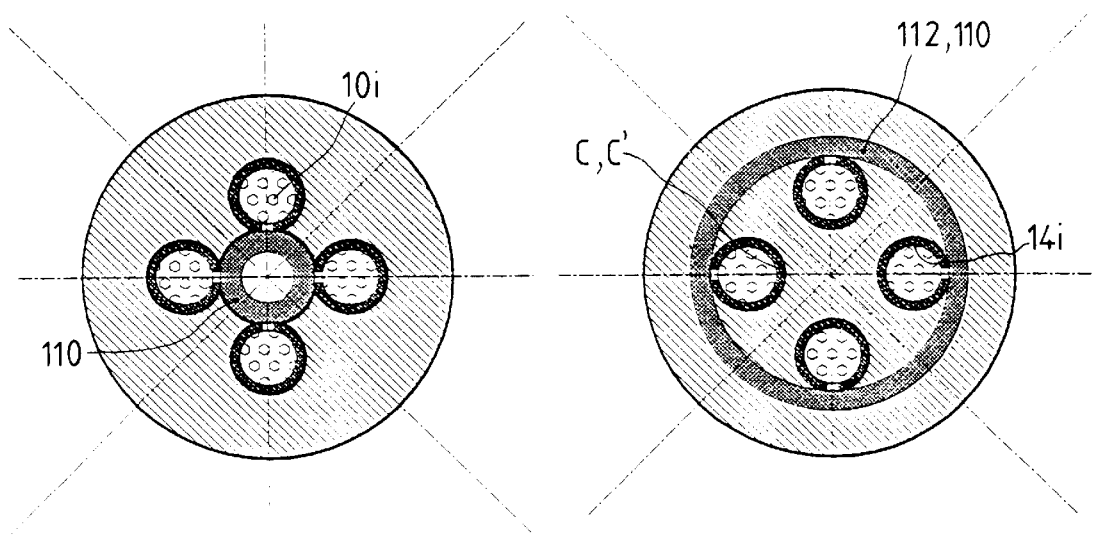
FIG. 6 is a cross-section view of a first embodiment of a device for putting four conductor terminations into register.
FIG. 7 is a view similar to FIG. 6 but showing a variant embodiment of the device.
Figure 9:
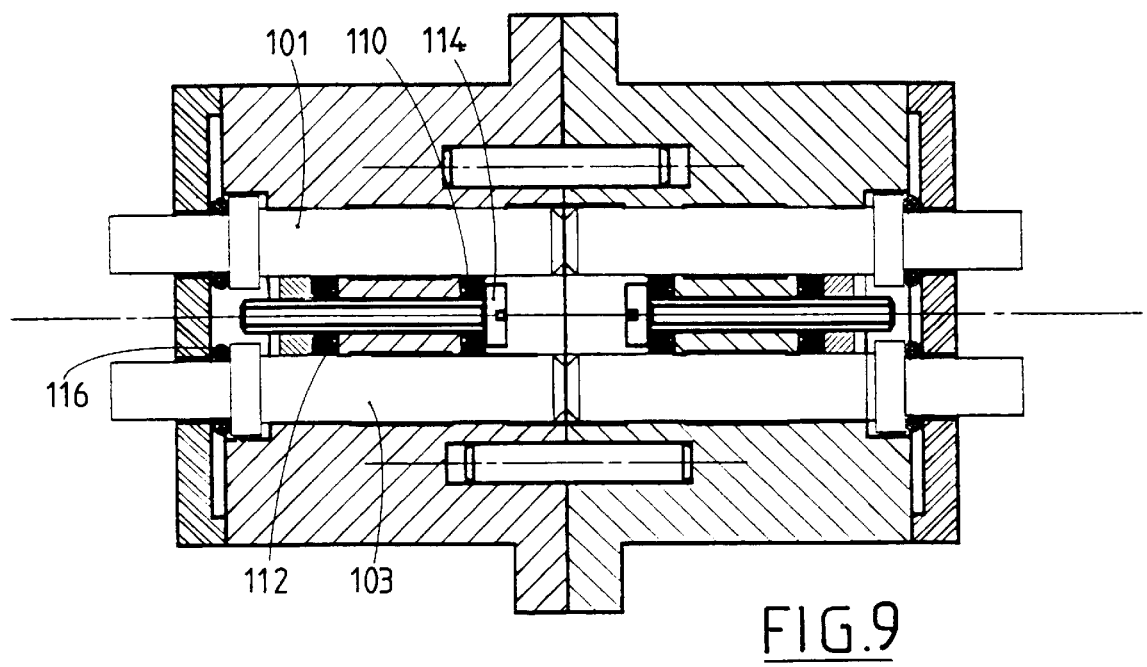
FIG. 9 is a longitudinal section view through a registering device for a plurality of terminations.

FIG. 6 shows in greater detail how a device for putting four terminations $10_i$ into register is implemented. The control device is analogous to that described with reference to FIGS. 3 and 4, i.e. it is constituted by two O-rings 110 and 112 as shown in FIG. 9, co-operating with a screw and nut system 114, 116. The housings in which the head of the screw and the nut are located together with the O-rings 110 and 112 communicate with the four cylindrical orifices in which the terminations are engaged. By tightening the screw 114, this expands or increases the outside diameter of the O-rings, thereby simultaneously pressing against all four terminations $10_i$.

FIG. 7 shows a variant embodiment in which the O-ring 112 is not located inside the set of cylindrical orifices $14_i$, but surrounds them. It will be understood that exactly the same result is obtained as in the example of FIG. 6, however registering now takes place by pressing against generator lines C, C' of the cylindrical orifices $14_i$.

In the above-described embodiments, the element with which the termination(s) is/are to be put into register comprises a base pierced by orifices similar or identical to those of the base of the device itself. This constitutes the equivalent of a connector with a male element and a female element.

Figure 10:
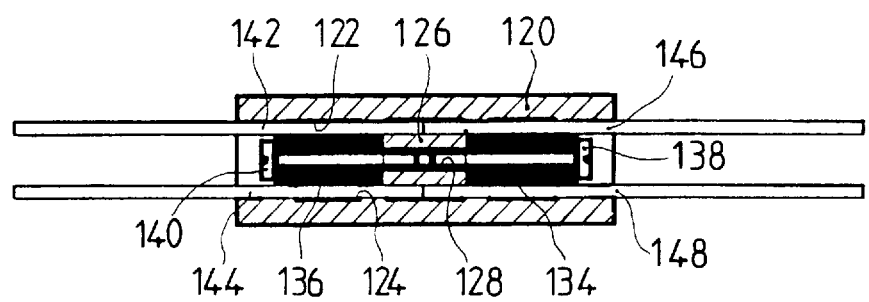
FIG. 10 is a longitudinal section view through an embodiment of the device in which only one base is used to put two terminations into alignment.

FIG. 10 shows another embodiment in which the referencing device serves directly to connect together two pairs of terminations that are capable of being disassembled but that are not "unpluggable".

The device thus comprises a base 120 in which two cylindrical orifices 122 and 124 are pierced. The middle portion 126 of the base is pierced by an axial tapped bore 128. Housings 130 and 132 are formed on either side of the middle portion in communication with the orifices 122 and 124. Deformable rings 134 and 136 are mounted on screws 138 and 140 engaged in the ends of the tapped hole 128. The pairs of terminations 142, 144 and 146, 148 are engaged in the orifices 122 and 124. By tightening the screws 138 and 140 to expand the deformable rings 134 and 136, forces are applied on the terminations that press them against respective generator lines of portions of the orifices 122 and 124. The terminations 142 and 144 are thus put into register with the terminations 146 and 148.

Naturally, the deformable O-ring system controlled by a screw and nut assembly is highly effective for putting terminations into register in cylindrical orifices and, in addition, such a system is easy to actuate. Nevertheless, it will be understood that it would not go beyond the invention to use means for pressing the terminations in a specified direction against the inside walls of the orifices, but having a mechanical structure that is not the same.

We claim:

1. A registering device for putting the termination of a conductor into register relative to another element, said termination having at least one cylindrical surface portion about an axis XX' and having a diameter D, said device comprising:

a base fitted with means for putting it into register relative to the other element and pierced by at least one orifice whose wall includes at least one cylindrical surface portion of diameter D'>D and of axis YY', extending over a length L; and pusher means for exerting a force along an axis ZZ' orthogonal to YY' and intersecting the axis YY' of the orifice in its cylindrical portion, said pusher means acting on the conductor termination in such a manner that a generator line of the termination is pressed against a generator line AA' of the orifice as defined by the axis ZZ', said generator line AA' occupying a determined position relative to the registering means of the base;

the pusher means acting over a portion of the conductor termination that is of sufficient length to ensure that the generator line of the termination is pressed against the generator line AA' of the orifice over a length that is sufficient to ensure that the axis XX' of said termination is indeed parallel to the axis YY' of the orifice.

2. A device according to claim 1, wherein the pusher means comprise at least one annular part that is deformable by compression in such a manner that its outside diameter increases under the effect of compression, a portion of the periphery of the annular part being suitable for penetrating in said orifice to exert on said termination a force in the direction ZZ', and means for applying said compression to said annular part.

3. A device according to claim 2, wherein the pusher means include a second deformable annular part offset relative to the first part in the direction of the axis YY' of said orifice.

4. A device according to claim 1 for putting n conductor terminations into register, said base comprising n orifices each including at least one cylindrical portion of axis $Y_1Y'_1$, said axes being mutually parallel, and said orifices being of diameters $D'_i$ greater than the diameters $D_i$ of the terminations, and the pusher means comprising a single control member and n pusher members controlled by said control member, each pusher member being associated with an orifice and exerting a force on the corresponding termination in a direction $Z_iZ'_i$.

5. A device according to claim 4, wherein the pusher means comprise at least one annular part deformable in compression in such a manner that its outside diameter increases under the effect of the compression, said annular part being suitable for penetrating into said n orifices to exert forces on said terminations in the directions $Z'iZ'_i$.

6. A device according to claim 5, wherein the pusher means include a second deformable annular part offset relative to the first part along the direction YY' of the axes of the orifices.

7. A device according to claim 3, wherein the means for applying said compression comprise a screw and nut assembly extending along the direction of the orifice axis YY', each annular part surrounding the body of said screw and being interposed between the nut or the head of the screw and a stationary mechanical abutment.

8. A device according to claim 7, wherein said nut and the head of the screw are provided with respected conical washers directed towards the annular part to favor radial expansion of said part.

* * * * *